Jan. 13, 1970 G. GRAMBERG ET AL 3,489,958

COATINGS FOR p-i-n BEVELED-EDGE DIODES

Filed Nov. 27, 1967

INVENTORS

Gerhard Gramberg

Max Koniger

BY Pierce, Scheffler & Parker

ATTORNEYS

United States Patent Office 3,489,958

Patented Jan. 13, 1970

3,489,958

COATINGS FOR p-i-n BEVELED-EDGE DIODES

Gerhard Gramberg, Baden, and Max Koniger, Nussbaumen, Switzerland, assignors to Aktiengesellschaft Brown, Boveri & Cie, Baden, Switzerland, a joint-stock company Filed Nov. 27, 1967, Ser. No. 685,917
Claims priority, application Switzerland, Dec. 2, 1966, 17,292/66
Int. Cl. H01l 3/00, 5/00
U.S. Cl. 317—234 4 Claims

ABSTRACT OF THE DISCLOSURE

A semiconductor valve comprises a slice of monocrystalline material having zones of different types of conductivity at its opposite end faces and an interposed high-resistance i-zone which forms a n-i-p structure. The end faces of the monocrystalline slice are flat, the surface between the end faces is bevelled, and the bevelled surface contains a doped surface layer with the same type of conductivity as the zone which terminates in the end face having the smallest area.

The invention relates to a semiconductor valve with a monocrystalline semiconductor slice having on its faces zones of different types of conductivity and an interposed i-zone for the purpose of forming a n-i-p structure, the surface of the semiconductor slice being of conical shape and its faces adjoining flat electrodes.

Figure 1:
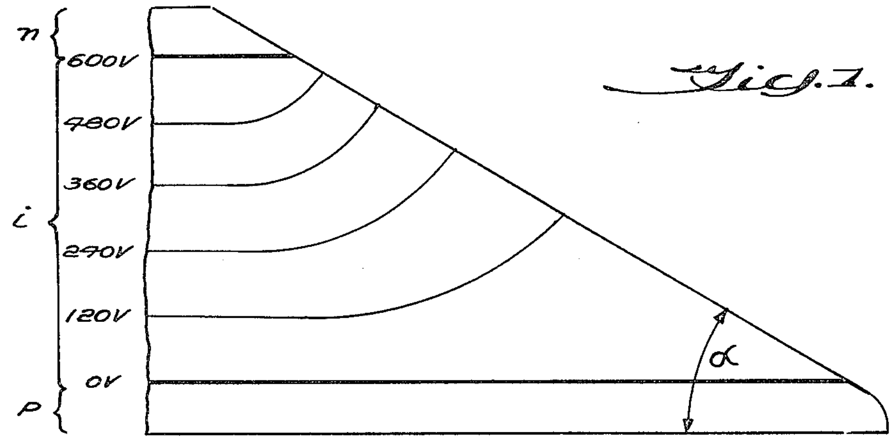

It is known that the breakdown voltage of high-voltage semiconductor valves is limited not only by the field-strength in the volume, but also by the dielectric strength on the surface of the semiconductor slice. On the surface much lower field-strengths lead to a voltage breakdown than in the volume of the semiconductor material. In the case of semiconductor valves with a p-n structure, it is known to reduce the maximum field-strength on the surface of the semiconductor slice by conically bevelling its marginal region. The reduction in surface field-strength caused by this bevelling has been investigated both theoretically and experimentally by Davies and Gentry (IEEE-Trans. ED–7, 313, 1964). On the other hand, it is impossible in the case of a semiconductor slice with a p-i-n structure to reduce the surface field strength uniformly by such bevelling. On the contrary, such bevelling on a p-i-n structure would greatly reduce the surface field strength over a large region of the bevelled surface, but greatly increase it in the vicinity of the obtuse angle of the bevel. In order to clarify this effect, the field-distribution of such a structure is illustrated in FIGURE 1. Bevelling the edge causes deformation of the equipotential surfaces, leading to a clear peak of field strength 1, 2 in the vicinity of the junction directed toward the obtuse angle of the bevel on the conical surface of the bevel in the region of the high-resistance i-zone.

It is the object of the invention to produce a semiconductor valve in which the said disadvantage is to a large extent avoided. The semiconductor valve according to the invention is characterised by a doped surface layer on the conically shaped surface exhibiting the same type of conductivity as that zone at the face of the semiconductor slice, being directed towards the constriction of the conical surface and having a surface density of doping atoms approximately equal to $n_R=n_F \cos\alpha$, $n_F$ signifying the maximum surface density of charge-carriers occurring in the semiconductor slice at maximum inverse voltage ($U_0$) at the bounding areas of the high-resistance i-zone in the neighbouring zones of p- and n-type conductivity and $\alpha$ the bevel-angle of the conical surface.

Figure 2:
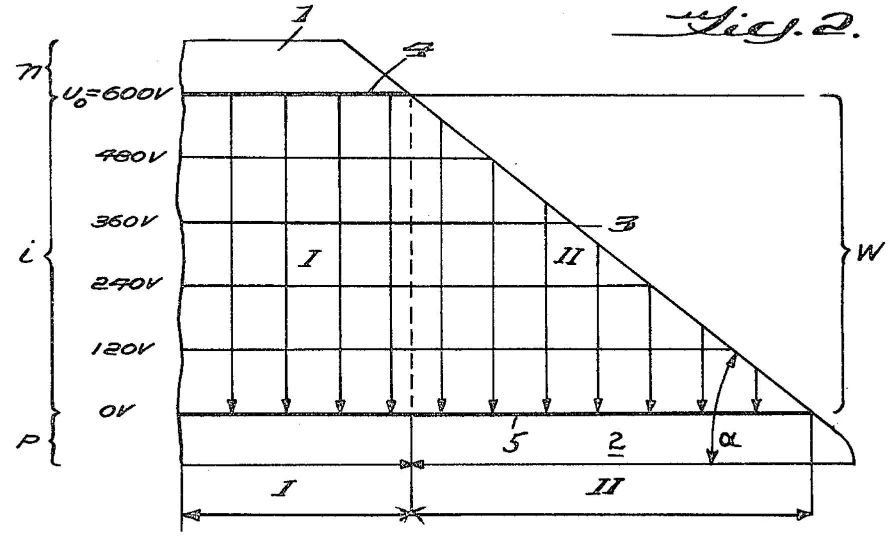

A marginal zone of the semiconductor slice is illustrated in section in FIGURE 2 in order to explain the action of the surface doping layer. The outline of the parallel faces 1 and 2 and of the bevel 3 will be recognized. The bounding areas 4 and 5 of the i-zone adjoin zones of n- and p-type conductivity respectively. This high-resistance i-zone is imagined to be subdivided into a central part-zone I and a marginal part-zone II. If a homogeneous field can be produced in the central part-zone I, the maximum attainable inverse voltage $U_0$ is determined by the maximum attainable field-strength $E_v$ before voltage-breakdown occurs in the volume of the semiconductor material. Thus, similarly to the case of a plate-condenser, $$E_v=\frac{U_0}{W}$$

W signifying the thickness of the high-resistance i-zone.

The surface-charge-density occurring at the bounding areas 4, 5 of the high-resistance i-zone corresponds to the dielectric displacement-density $D_v$ of the homogeneous field $$D_v=\epsilon_r\epsilon_0E_v$$

with as the dielectric constant of the semiconductor material.

The existence of the homogeneous field in the central part-zone I is made possible in the case of the arrangement according to the invention by generating the same homogeneous field in the marginal part-zone II. According to the invention this is done by producing on the conically bevelled surface 3 by a surface doping layer a surface charge which, related to the unit of the base area of part-zone II, corresponds at the highest blocking voltage $U_0$ to the dielectric displacement-density $D_v$ determinant for the desired homogeneous field in the central part-zone I. Thus $$D_v=\epsilon_r\epsilon_0E_v=e\cdot n_R\frac{1}{\cos\alpha}$$

where $e$ signifies the elementary charge, and $e\cdot n_R$ the surface charge density and $\alpha$ the angle of the bevel surface.

Figure 3:
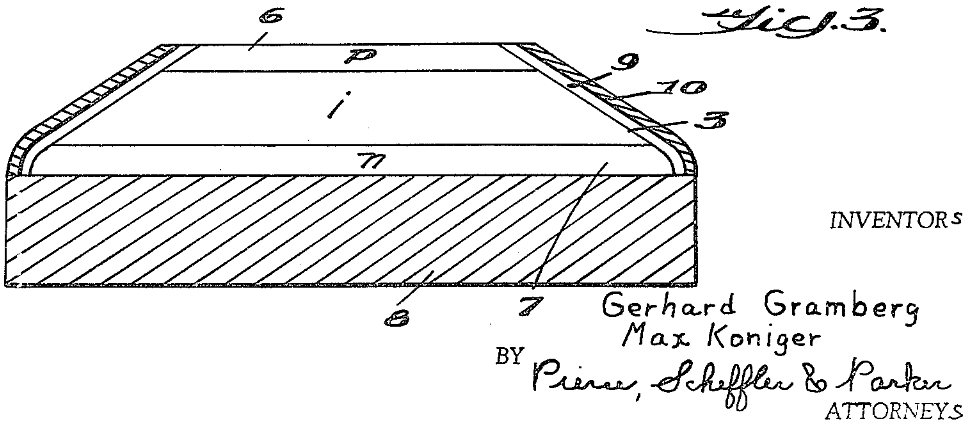

The process explained hereinafter with reference to FIGURE 3 serves for example to produce the semiconductor valve according to the invention.

A slice of high-resistance silicon (for example lightly p-doped with $\rho\approx1000\Omega$ cm. with a thickness of 300–400 $\mu$m. has boron diffused into one face for 15–30 hours at 1250–1300° C. in order to form a heavily doped layer 6 of p-type conductivity and phosphorus into the other face in order to form a heavily doped layer 7 of n-type conductivity so that a p-i-n structure with a high-resistance i-zone (200–300 $\mu$m. wide) remains. The conically bevelled surface 3 is now formed with the aid of an ultrasonic tool. Thereupon, a layer 9 of silicon doped with boron atoms is supplied from the gas phase at a temperature of between 1100 and 1200° C. by means of a process known as epitaxy. The dimensions must be in accordance with the equations derived above. The maximum field-strength attainable in silicon at which voltage-breakdown does not occur (approx. 200 kv./cm.), its dielectric constant $\epsilon$ (approx. 12) and an angle $\alpha<20°$ result in surface-densities $n_F\approx10^{12}$ doping atoms/cm.$^2$. Such a surface density is attained for example by an epitaxial layer with a thickness of 10 $\mu$m. and a doping concentration of $10^{15}$ cm.$^{-3}$. Finally, a layer 10 of protective varnish is applied, the semiconductor slice is soldered to a molybdenum carrier plate 8, and the active semiconductor unit thus produced is suitably provided with contacts and a housing.

According to an advantageous variant, the layer 6 of varnish may be replaced by a layer of oxide.

According to further production variants, the doped surface layer may also be produced by means of diffusion or ion-bombardment of suitable doping atoms into the bevelled marginal surface 3.

We claim:

1. Semiconductor valve with a monocrystalline semiconductor slice having on its faces zones of different types of conductivity and an interposed high-resistance i-zone for the purpose of forming a n-i-p structure, the surface of the semiconductor slice being of conical shape, and its faces adjoining flat electrodes, characterised by a doped surface layer (9) on the conically shaped surface (3) exhibiting the same kind of conductivity as that zone (6) at the face of the semiconductor slice being directed towards the constriction of the conical surface (3) and having a surface density of doping atoms approximately equal to $n_R = n_F \cos \alpha$, $n_F$ signifying the maximum surface density of charge-carriers occurring in the semiconductor slice at maximum inverse voltage ($U_0$) at the bounding areas of the high-resistance i-zone in the neighbouring zones of p- and n-type conductivity and $\alpha$ the bevel-angle of the conical surface.

2. Semiconductor slice according to claim 1, characterised by a protective layer (10) applied to the doped surface layer.

3. Semiconductor slice according to claim 2, characterised in that the protective layer (10) consists of a layer of varnish.

4. Semiconductor slice according to claim 2, characterised in that the protective layer (10) consists of a layer of oxide.

References Cited

UNITED STATES PATENTS

| | | | |
|---|---|---|---|
| 3,332,143 | 7/1967 | Gentry | 29—583 |
| 3,370,209 | 2/1968 | Davis et al. | 317—235 |
| 3,386,163 | 6/1968 | Brennemann et al. | 29—571 |

JERRY D. CRAIG, Primary Examiner

U.S. Cl. X.R.

148—1.5, 175